United States Patent [19]
Mattioli et al.

[11] 3,849,854
[45] Nov. 26, 1974

[54] METHOD FOR MAKING EVAPORATOR OR CONDENSER UNIT

[75] Inventors: Harold Philip Mattioli, Simsbury; Robert John Douglas, Windsor, both of Conn.

[73] Assignee: Emhart Corporation, Bloomfield, Conn.

[22] Filed: Sept. 24, 1973

[21] Appl. No.: 400,419

[52] U.S. Cl. ........ 29/157.3 B, 29/421 M, 29/471.1, 29/479, 29/497.5, 29/157.3 R
[51] Int. Cl... B21d 53/00, B21k 29/00, B23p 15/26
[58] Field of Search ..... 29/157.3 B, 157.3 R, 471.1, 29/471.3, 421 M, 497.5, 498, 479, 475; 219/7.5, 8.5, 9.5, 10.41, 10.43

[56] References Cited
UNITED STATES PATENTS

| | | | |
|---|---|---|---|
| 3,498,866 | 3/1970 | Kilbane | 156/285 |
| 3,590,460 | 7/1971 | Highducheck et al. | 29/421 M |
| 3,708,864 | 1/1973 | Patel | 29/479 |
| 3,750,248 | 8/1973 | Morris | 29/157.3 R |
| 3,760,481 | 9/1973 | Greever | 29/157.3 R |

*Primary Examiner*—C. W. Lanham
*Assistant Examiner*—Victor A. DiPalma
*Attorney, Agent, or Firm*—McCormick, Paulding & Huber

[57] ABSTRACT

The method of making an evaporator or condenser unit for refrigeration apparatus wherein ends of preferably aluminum main tubes extended through heat exchange plates or fins are joined together by U-bend connector tubes and transition tubes made from another metal, preferably copper, to form a serpentine coil. One end of each transition tube is telescopically assembled with an associated end of a main tube and metallurgically bonded thereto by an electromagnetic solid state joining process. The other end of each transition tube is telescopically assembled with an associated end of a connector tube and soldered thereto.

8 Claims, 6 Drawing Figures

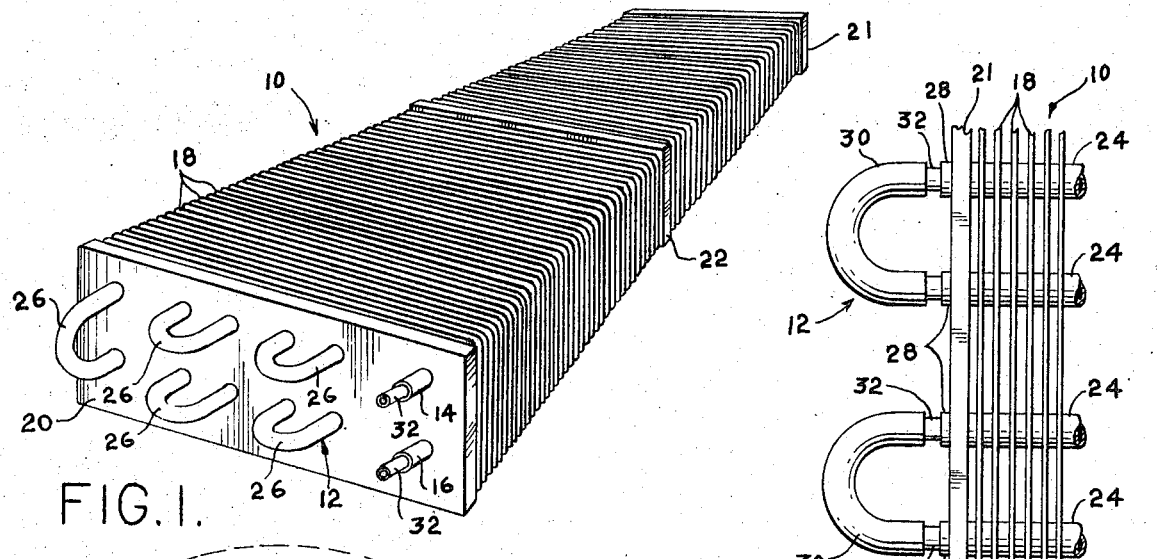
FIG. 1.
FIG. 2.
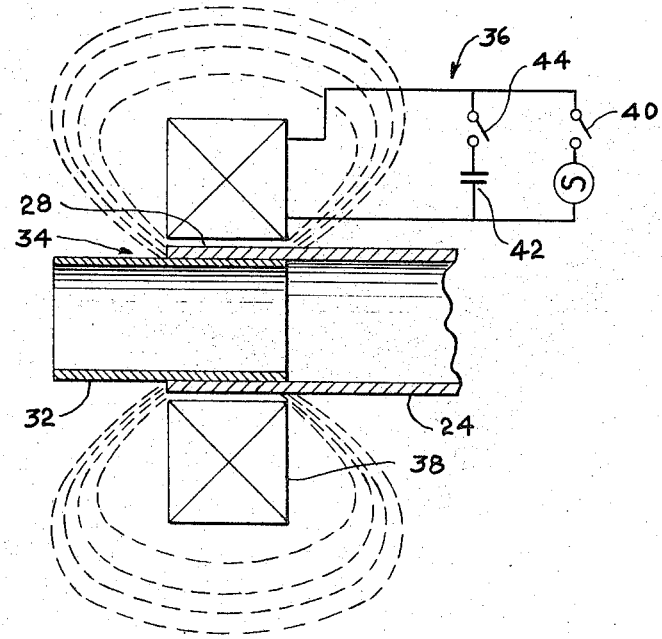
FIG. 3.
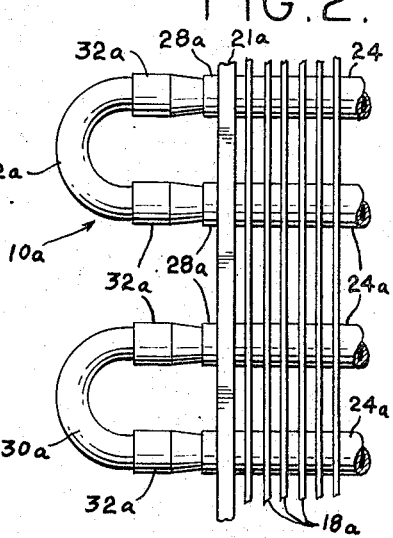
FIG. 5.
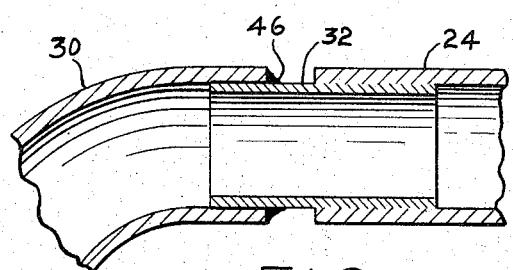
FIG. 4.
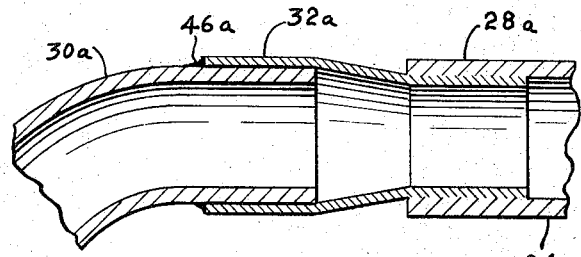
FIG. 6.

METHOD FOR MAKING EVAPORATOR OR CONDENSER UNIT

BACKGROUND OF THE INVENTION

This invention relates in general to an improved method for making an evaporator or condenser unit for refrigeration apparatus and deals more particularly with an improved method for making a unit which comprises a serpentine metal coil formed by parallel straight tube sections which extend through a series of heat exchange plates or fins and are connected together by U-bend connector tubes. A structure of the afore-described general type is usually made by soldering U-shaped return bends to straight tube sections of the same metal. Such soldered construction has proven most satisfactory where a coil is made from metal, such as brass or copper, which may be easily joined by a conventional torch soldering or brazing technique. However, because of the relative high cost of metals and alloys of the latter kind, aluminum and other materials more difficult to solder have gained acceptance as suitable materials for the construction of evaporator and condenser units. Unfortunately, the difficulties encountered in making satisfactory soldered joints in coils made from the latter materials tend to offset at least some of the saving realized through their use.

Heretofore, transition joints made from two dissimilar metals have been employed in the refrigeration art for making field connections between coils made from one of the metals and apparatus or systems which comprise tubing made from the other of the metals. The present invention contemplates the provision of an evaporator or condenser unit wherein the coil thereof is made from two dissimilar metals, one of the metals being substantially more difficult to solder than the other. The joints between the two dissimilar metals which form the coil are made by a solid state joining process. The joints between parts of like metal which comprise the coil are formed by conventional torch soldering or brazing operations and involve only the more easily soldered metal.

SUMMARY OF THE INVENTION

In accordance with the present invention there is provided an improved method of manufacturing evaporator or condenser units for refrigeration apparatus comprising the steps of providing a plurality of main tube sections of one metal and joining an end portion of one of said main tube sections to an end portion of the other of the main tube sections by a U-shaped connector tube and a pair of transition tubes of another metal. Each transition tube is telescopically assembled in an associated end of a main tube section to define a transition joint assembly. Each joint assembly is then heated to a temperature below the melting temperature of both the main tube section metal and the transition tube metal. While the joint assembly is in its heated condition a sufficient radially directed force is simultaneously applied around the one joint assembly to effect a substantially solid state metallurgical joinder of the transition tube and the main tube at the interface delineated by the mating surfaces thereof which results in elimination of the latter interface. After the transition joints have been formed, the main tubes are thrust through heat exchange plates in generally parallel relation and the plates arranged in generally longitudinally spaced relation along the main tubes. Each transition tube is then telescopically assembled with an associated end portion of a U-shaped connector tube and a solder joint is formed therebetween.

BRIEF DESCRIPTION OF THE DRAWING

FIG. 1 is a perspective view of an evaporator or condenser unit made in accordance with the method of the present invention.

FIG. 2 is a somewhat enlarged fragmentary plan view of the remote end of the unit of FIG. 1.

FIG. 3 is a somewhat enlarged fragmentary longitudinal sectional view through a partially completed transition joint, an electromagnetic apparatus for forming the joint being shown somewhat schematically.

FIG. 4 is a somewhat enlarged fragmentary longitudinal sectional view through a transition joint of the evaporator or condenser unit of FIG. 2.

FIG. 5 is a fragmentary plan view similar to FIG. 2, but shows another evaporator or condenser unit made in accordance with the method of the present invention.

FIG. 6 is a somewhat enlarged fragmentary longitudinal sectional view through a transition joint of the evaporator or condenser unit of FIG. 5.

DETAILED DESCRIPTION OF PREFERRED METHODS

Turning now to the drawing and referring first particularly to FIGS. 1 and 2 thereof an evaporator or condenser unit made in accordance with the present invention and indicated generally by the number 10 comprises a metal tube or coil indicated generally at 12 for containing a refrigeration fluid. The coil has inlet and outlet ends 14 and 16 and extends in sinuous or serpentine form through a plurality of heat exchange plates or fins 18, 18 mounted in parallel series along the straight runs of the coil 12. The unit 10 further includes at least one pair of header plates 20 and 21 mounted on the coil 12 near opposite ends thereof and outward of the fins 18, 18 to impart unitary strength to the unit 10, as required, particularly during transportation and installation. One or more intermediate support plates, such as indicated at 22, may, if desired, also be mounted on the coil 12 intermediate the header plates 20 and 21 to impart further rigidity to the structure.

Considering now the coil 12 in further detail, it includes a series of parallel main tube sections 24, 24 which define the straight runs. U-shaped return bends connect the main tube section and may comprise separate pieces joined to the ends of the main tube sections, but preferably, and as shown, each pair of main tube sections 24, 24 comprise part of a single elongated tube which includes an integral U-shaped return bend section 26. In FIG. 1 the latter integral return bend sections appear at the near end of the unit 10. Thus, in the illustrated case each main tube section 24 has one tube end 28 disposed at the opposite or remote end of the unit 10, as it appears in FIG. 1. The end portion 28 of each main tube section 24 in each pair is connected to the end portion 28 of an associated main tube section 24 of an adjacent pair by a generally U-shaped connector tube 30 and a pair of transition tubes 32, 32 as shown in FIG. 2. In accordance with the present invention, the main tube sections 24, 24 are made from one metal, preferably, aluminum, whereas the connector tubes 30, 30 and the transition tubes 32, 32 are made from another metal, preferably, copper. Each transition tube 32 is joined to an associated end portion 28 of a main tube section 24, preferably before the fins 18, 18 and the plates 20, 21 and 22 are assembled on the main tube sections 24, 24. Each connector tube 30 is joined to a pair of associated transition tubes 32, 32 to complete the coil 12.

Considering now the method for making the unit 10, a plurality of elongated straight tubes are bent to a U-shape or hairpin-like main form to define a pair of straight main tube sections 24, 24 connected by an integral U-bend connecting section 26. In making the illustrated unit 10, five such hairpin-like main tube structures are employed. Two additional straight main tube sections 24, 24 are also provided which define the inlet end 14 and the outlet end 16.

In accordance with the present invention, each transition tube 32 is telescopically assembled in an associated end portion 28 of each main tube section 24 to form a transition joint assembly designated generally at 34, as shown in FIG. 3. The outside diameter of the illustrated transition tube 32 is substantially equal to the inside diameter of the main tube section 24 to interface therewith in telescopic assembly therein. As previously noted, the transition tube 32 and the main tube section 26 are made from different metals. The transition joint assembly 34 is heated to a temperature below the melting temperature of both of the latter metals. While the joint assembly 34 is in its heated condition, sufficient radially directed force is simultaneously applied around the joint assembly to effect a solid state metallurgical joinder of the one end portion 28 and the transition tube 32 which eliminates the interface delineated by the mating surfaces thereof as shown in FIG. 4.

In FIG. 3 the joint assembly 34 is shown positioned in an electromagnetic solid state joining apparatus illustrated schematically and designated generally by the reference numeral 36. The apparatus 36 is of a type marketed by Thermo Magnetics, Incorporated, Woburn, Mass. and provides means for obtaining precisely controlled heat and magnetic pressure combinations to produce high integrity metallurgical bonds between similar and dissimilar metals or alloys in a joint assembly such as 34. The apparatus 36 includes an induction or work coil 38 which receives the joint assembly 34 in coaxial alignment therein. Controlled heat is applied to the joint by induction when high frequency alternating current is passed through the coil as by closing a switch 40. While the joint assembly 34 is in a heated condition electrical energy stored in a capacitor bank 42 is transferred to the compression or work coil 38 by ignitron electronic switches, indicated schematically at 44, which enables the work coil 38 to develop magnetic pressures of up to 50,000 psi for periods of typically 10 to 20 microseconds duration. This pulsed high intensity magnetic field induces a current in the conductive metal of the tube joint assembly 34. Because this induced current prevents the generation of a magnetic field within the tube joint, a net force proportional to the square of the magnetic flux density is exerted in a radially inwardly direction relative to the outside surface of the tube section 24. Since the metals which comprise the tube joint have finite resistivities, the induced currents are limited, thereby allowing the magnetic pressure to leak through the joint with passage of time. It is for this reason that the magnetic field generated is of short duration.

The rate at which heat is applied to the joint assembly, the time that the heat is maintained thereon and the electromagnetic pressure which is applied thereto will, of course, be determined by the particular materials to be joined. However, once these parameters have been selected, the electronic circuitry controls associated with the apparatus 36 will assure uniform joint production, so that all of the transition joints associated with the unit 10 will be of substantially uniform integrity. No special cleaning procedures are required to prepare the transition tube and the end portion for joinder, nor is any machining required after the joint is made.

The finished joint is characterized by a coalescence or coming together of the materials, as by diffusion. Melting of the material does not occur. The solid state joining apparatus is well known in the metallurgical art.

Apertures are formed in the various fins 18, 18 and plates 20, 21 and 22 to receive the main tube sections 24, 24 and associated transition joint assemblies 34, 34 therethrough. The coil 10 is assembled by supporting the various plates and fins in aligned parallel relation while the various main tube sections and associated transition tubes are thrust therethrough. The integral connected main tube sections 24, 24 are inserted in pairs through the plates 20, 22 and 21 through the various fins 18, 18 positioned therebetween. In assembly, the transition tube 32, 32 are disposed outwardly beyond the header plate 21 as best shown in FIG. 2. The transition tubes 32, 32 are next connected in pairs by the generally U-shaped connector tubes 30, 30 which are of the same material as the transition tubes 32, 32. In the embodiment shown in FIG. 2 the outside diameter of each transition tube 32 is substantially equal to the inside diameter of an associated connector tube 30 in which it is telescopically received. The joint between the transition tube 32 and the connector tube 30 is formed by a conventional bonding process, such as soldering or brazing. In the illustrated case, the connector tube 30 and the transition tube 32 are both made from copper and joined by soldering as indicated at 46 in FIG. 4. The straight tube sections which define the inlet end 14 and the outlet 16 are joined in like manner to associate connector tubes 30, 30 at the remote ends of the unit 10. If desired, the inlet 14 and the outlets 16 may each be provided with a short transition tube. However, the particular construction arrangement of the inlet and outlet ends of the unit will, of course, be determined by the nature of the system to which the unit is to be connected. Thus, for example, if the main tubes which comprise the unit 10 are made from aluminum and the unit is to be connected to a copper system the inlet and outlet 14 and 16 will preferably be provided with short copper transition tubes 32, 32, as shown in FIG. 1, joined thereto in the manner aforedescribed.

After the coil 12 is completed it is preferably hydraulically expanded to bring it into tight engagement with the various plates and fins. The unit 10 is completed by applying a coating of suitable protective material to the exterior surface of each main tube end 28 and its associated transition tube 32 in the region of the joint therebetween to seal the joint from the atmosphere to prevent electrolysis or corrosion in the region of the joint. The latter coating may be applied by dipping or painting.

Another method for making an evaporator or condensor in accordance with the present invention is illustrated in FIGS. 5 and 6 wherein the evaporator or condensor unit is indicated generally by the reference number 10a. Parts of the unit 10a which correspond to parts of the unit 10, previously discussed, bear the same reference numeral as the previously described parts and a letter a suffix and will not be hereinafter further described.

In accordance with the further method of invention, illustrated in FIGS. 5 and 6, each transition tube 32a is expanded at one end to telescopically receive an associated end portion of a connector tube 30a therein. This expanding operation may be performed either before or after the transition tube is assembled in an associated main tube end portion 28a. HOwever, it should be noted that after expansion the outside diameter of the enlarged end of the transition tube 32a is not greater than the outside diameter of the main tube 24a. Thus, the transition tube may freely pass through the apertures in the various fins and plates during assembly. The procedure for forming the solid state transition joint between the transition tube 32a and the main tube end portion 28a is substantially as aforedescribed. The connector tube 32a and joined thereto by a conventional torch brazing or soldering process.

We claim:

1. A method for making an evaporator or condenser for refrigeration apparatus comprising the steps of providing a plurality of main tube sections made from one metal and defining a plurality of main tube ends, providing a plurality of transition tubes made from another metal, each of said transition tubes including at least one end portion having an outside diameter substantially equal to the inside diameter of an associated one of said main tube ends to generally interface in telescopic assembly therewith, telescopically assembling each one end portion in an associated one of said main tube ends to define a transition joint assembly, heating each transition joint assembly to a temperature below the melting temperature of both said one metal and said other metal, applying sufficient radially directed force simultaneously around each transition joint assembly while said transition joint assembly is in its heated condition to effect a solid state metallurgical joinder of said one end portion to said main tube end which eliminates the interface delineated by the mating surfaces thereof, providing a plurality of heat exchange plates having apertures therein for receiving therethrough each of said main tube sections and an associated transition tube joined thereto, thrusting said main tube sections through said heat exchange plates in generally parallel relation to dispose said plates in parallel spaced relation along said main tubes, providing at least one generally U-shaped connector tube made from said other metal and having a pair of connector tube ends, telescopically assembling each of said connector tube ends with an associated other end of said transition tube to form another tube joint, and bonding each of said connector tube ends to said other end of an associated one of said transition tubes.

2. A method for making an evaporator or condenser as set forth in claim 1 wherein the step of providing a plurality of main tube sections is further defined as providing a plurality of generally U-shaped tubes, each of said U-shaped tubes having a pair of elongated parallel straight main tube sections joined together by an integral generally U-shaped intermediate section, each of said main tube sections defining one of said main tube ends, and the step of thrusting said main tube sections through said heat exchange plates is performed after the steps of telescopically assembling each said one end portion in an associated main tube end to define a transition joint assembly, heating each transition joint assembly, and applying radially directed force around each transition joint assembly.

3. A method for making an evaporator or condenser construction as set forth in claim 1 wherein the step of applying force is further characterized as applying electromagnetic pressure for a fraction of a second around each said transition joint assembly.

4. A method for making an evaporator or condenser as set forth in claim 3 wherein the step of applying electromagnetic pressure is further defined as coaxially aligning said transition joint assembly in an induction coil and applying a pulsed electrical current to said coil.

5. A method for making an evaporator or condenser coil as set forth in claim 4 wherein the step of heating comprises the step of applying alternating electrical current to said coil.

6. A method for making an evaporator or condenser construction as set forth in claim 1 including the additional step of applying a coating material to the exterior surface of each one end portion and each associated main tube end in the region of the transition joint therebetween to seal the latter region from the atmosphere.

7. A method for making an evaporator or condenser construction as set forth in claim 1 wherein the step of bonding each of said connector tube ends is further defined as soldering each of said connector tube ends.

8. A method for making an evaporator or condenser construction as set forth in claim 1 including the additional step of enlarging the inside diameter of said other end of each of said transition tubes, said step of enlarging to be performed before the step of telescopically assembling each of said connector tube ends.

* * * * *